Feb. 20, 1962  H. W. BIGGE ET AL  3,021,970
TRAILER STAKE SYSTEM
Filed May 15, 1959  4 Sheets-Sheet 1

INVENTORS
HENRY W. BIGGE
WILLIAM A. WHITMIRE
BY
ATTORNEY.

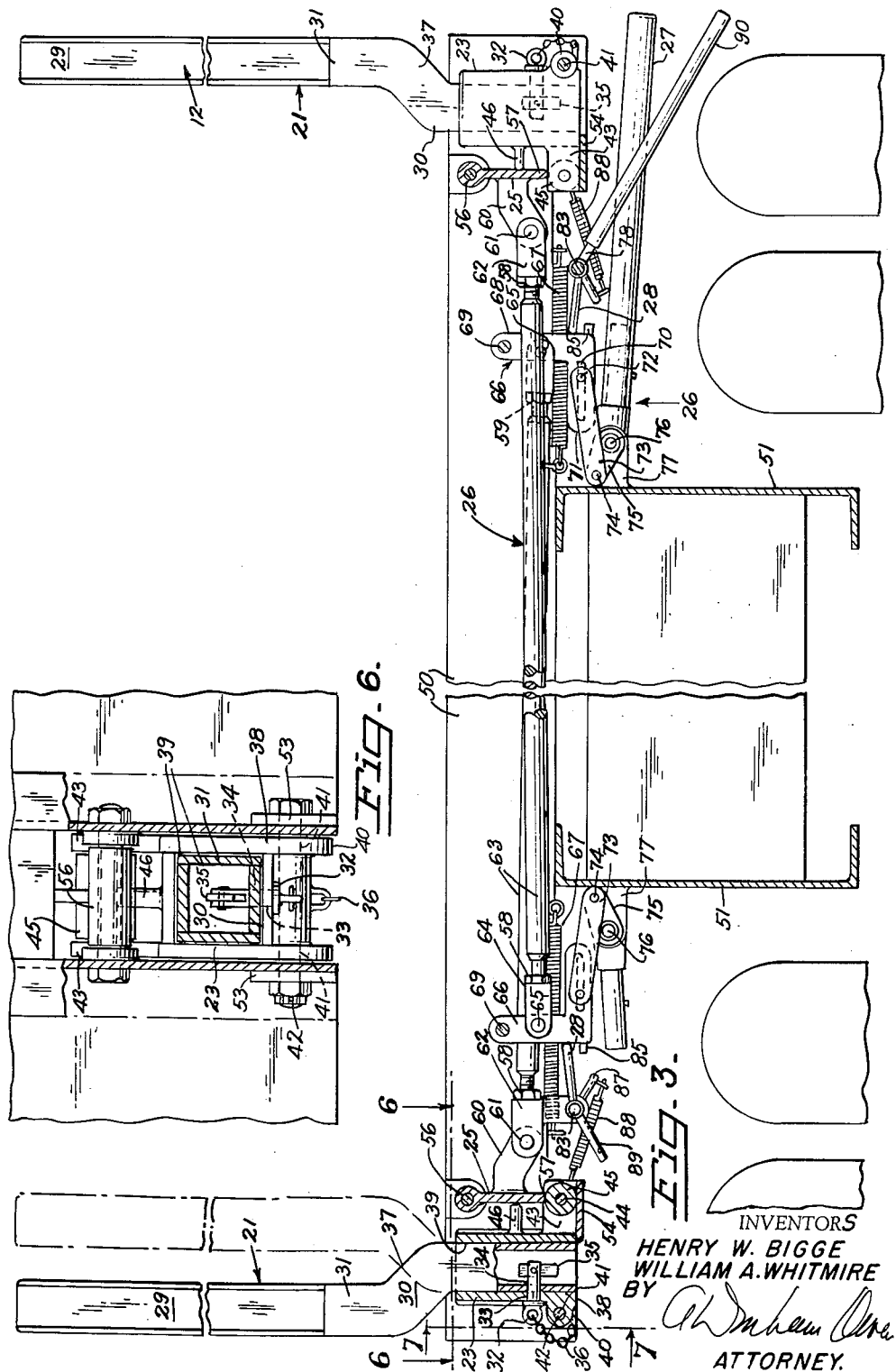

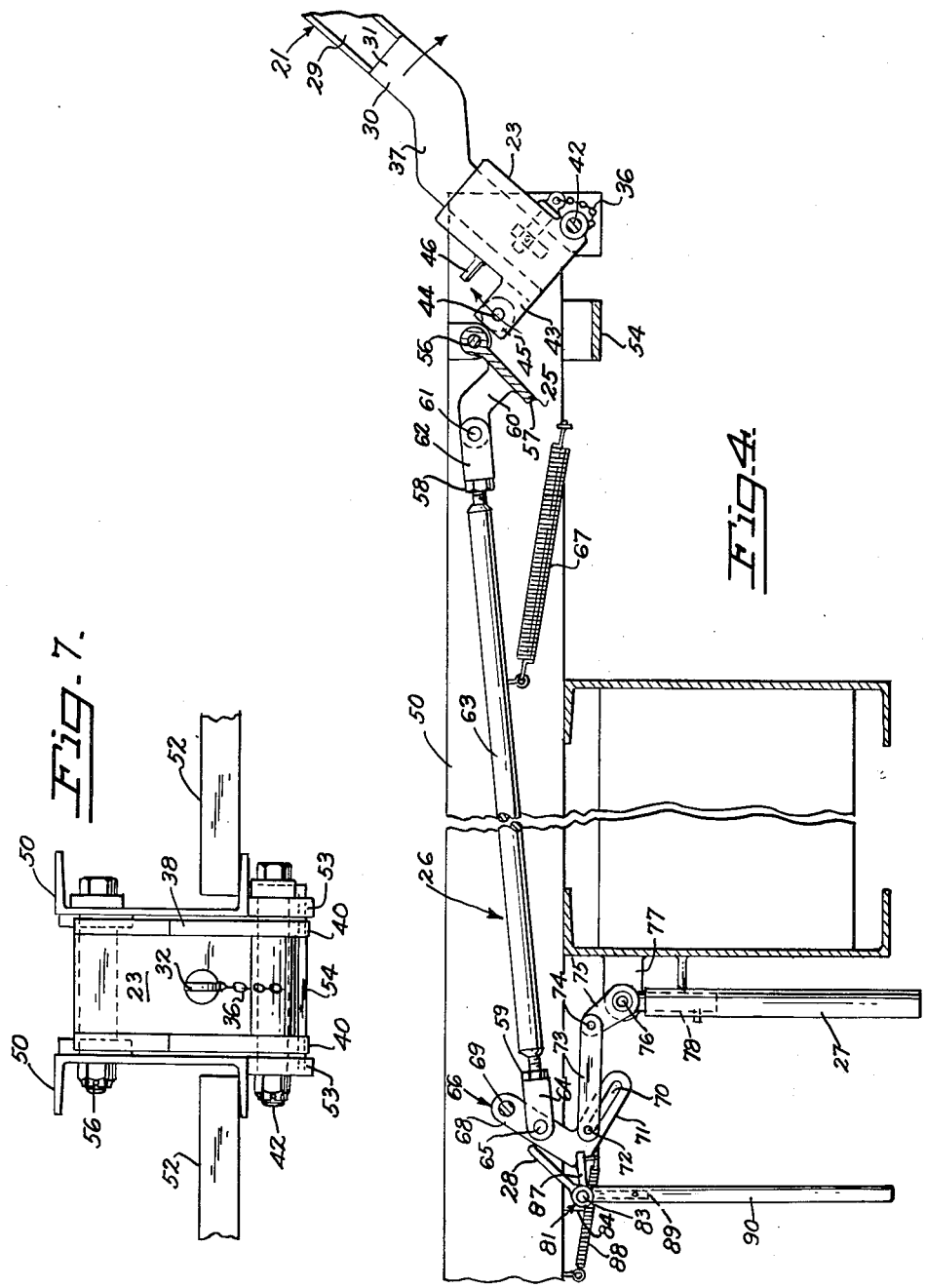

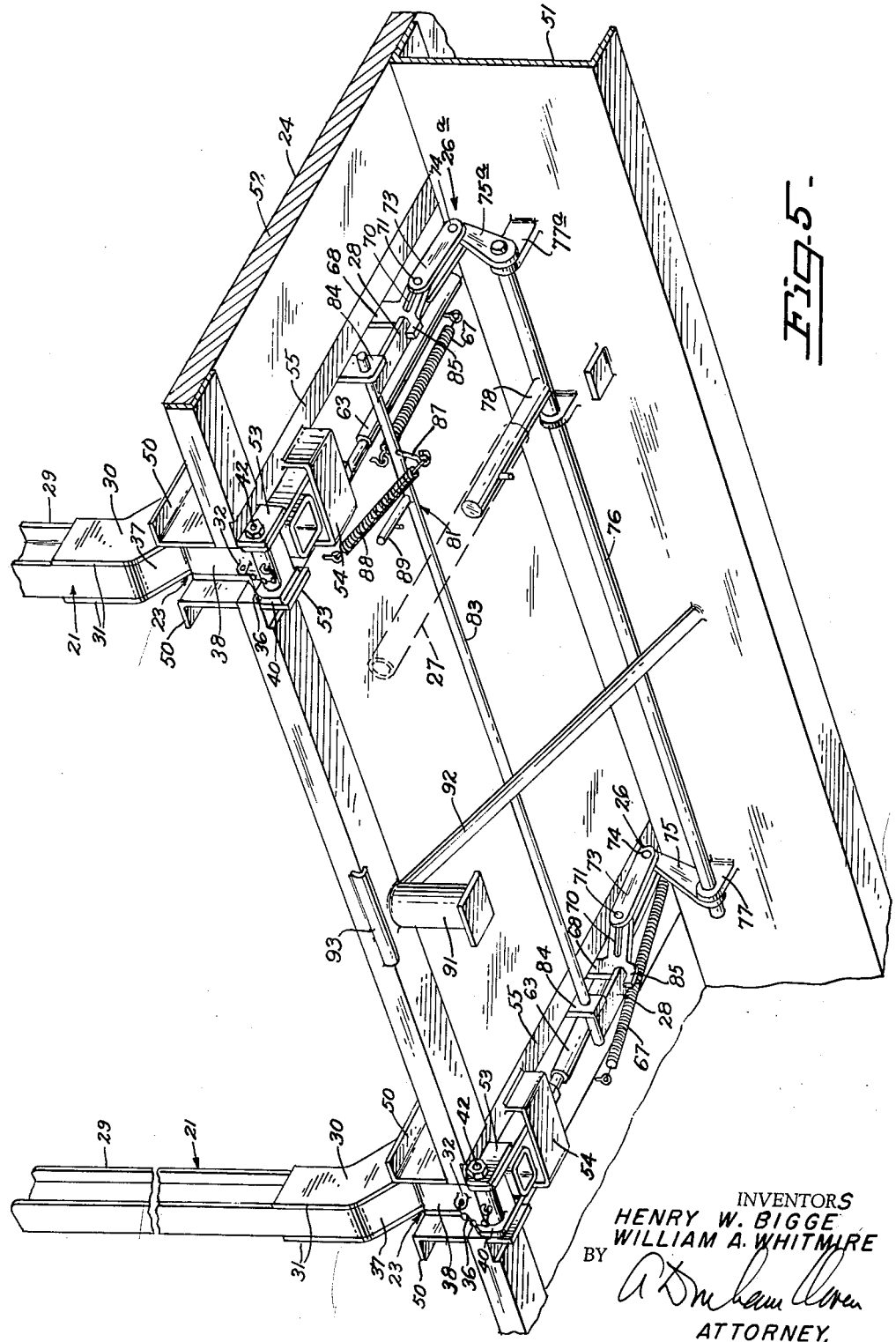

3,021,970
TRAILER STAKE SYSTEM
Henry Wilhelm Bigge, Oakland, and William A. Whitmire, Castro Valley, Calif.; said Whitmire assignor to said Bigge
Filed May 15, 1959, Ser. No. 813,388
12 Claims. (Cl. 214—85)

This invention relates to freight-carrying vehicles for hauling long cylindrical objects such as logs, pipes, or thin steel shells used for concrete forms or molds. More particularly, the invention relates to such vehicles having a load-retaining system comprising stakes or posts which, when released, serve as an unloading ramp.

The loading and unloading of relatively long, cylindrical or odd-shaped objects has long been a perplexing problem in the freight-handling industry. Such objects cannot be stacked to any reasonable height without the use of some type of retaining posts or stakes, generally placed upright along the sides of the loading bed of the vehicle. The need for the retaining stakes is particularly apparent where the objects are relatively light in weight, as is the case with cylindrical shells or tubes used as forms, as for concrete pillars. When the retaining stakes of the present invention are provided, these lightweight shells can be stacked to a considerable height, so long as the load remains within the load-weight limit of the vehicle.

With a vehicle having a weight capacity for a large stack of tubes or shells, the problem is not only how to stack and retain the shells or tubes while in transit but also how to unload the vehicle upon arrival at its destination. Heretofore, the unloading of the shells or tubes was performed by using additional equipment, such as cranes and the like, which lifted the shells separately or in bundles directly from the vehicle. This unloading method required extra time and labor, in addition to the auxiliary freight-handling equipment. Where the specialized equipment was not available, it was necessary to resort to more primitive manual methods of unloading.

Other prior-art unloading systems for stake-retained cargoes have utilized side dumping by tilting the truck bed prior to or along with removal of the retaining stakes. This method proved to be inefficient because the entire load had to be lifted and because it complicated the stake removal from the side of the truck. Still other attempts to provide releasable stakes produced only cumbersome devices of limited utility.

The present invention solves the cargo-securing and cargo-unloading problems by providing a novel cargo-stake system which safely retains high-stacked loads, such as normally unstable cylindrical objects, and is controlled by a novel tripping linkage which releases the stakes and utilizes them as a ramp for unloading the cargo. The linkage is actuated by an operator located on the side of the vehicle opposite to the stakes.

One object of the present invention is to provide load-retaining stakes which are adjustable on a vehicle to snugly accommodate tube-like objects of different diameters.

Another object is to provide pivotally mounted stake-supporting pockets which are adapted to removably retain stakes of any desired length.

Another object of the present invention is to provide such pockets in pairs interconnected by a linkage and releasable simultaneously by a control mechanism, to swing a pair of stakes to the ground where they serve as a ramp for safe controlled dumping of the objects.

Still another object of the present invention is to provide a safety lock for a cargo-retaining system of releasable hinged stakes, to prevent accidental dumping.

Another object of the present invention is to provide a system of cargo-retaining hinged stakes on a flat-bed vehicle wherein the stakes are released in pairs by a control mechanism for lowering them into their ramp position to facilitate unloading of the cargo, and are returned one at a time to the upright position after the cargo has been unloaded.

Another object of the present invention is to provide releasable cargo-stakes which can be lowered from either side of a large vehicle by an operator on the opposite side thereof, located safely out of the way of the cargo.

Other objects and advantages of the present invention will be apparent from the following description and from the drawings, in which:

FIG. 1 is a view in perspective and partially in section of a portion of a typical freight-carrying vehicle with a load of tube-like objects retained by a hinged-stake system embodying the principles of the present invention. One pair of hinged stakes is shown in broken lines in its unloading position where it serves as a ramp.

FIG. 2 is a rear view of the vehicle of FIG. 1, showing the hinged cargo stakes at one side of the vehicle in the down-position during the unloading process. Shown in phantom are the cargo stakes, with the load and snubbing rope in an intermediate position. The stake linkage details have been omitted in order to emphasize the unloading process.

FIG. 3 is a fragmentary enlarged view in section through the loading deck of the vehicle, taken along line 3—3 of FIG. 1, showing the cargo stakes of the present invention and the interconnecting linkage mechanism thereof, with the stakes in the upright position. The view is broken away in several places to conserve space, and broken lines show the left-hand stake in an alternative position.

FIG. 4 is a view in section taken at the same place and on the same scale as FIG. 3, but showing only one stake-linkage as it is being released.

FIG. 5 is a fragmentary view in perspective and partly in section of the underside of the freight-carrying vehicle, showing the interconnecting linkage of a pair of stakes on one side of the vehicle. Broken lines show the handle for the linkage system.

FIG. 6 is a view in horizontal section of the stake within the stake-pocket, taken along line 6—6 of FIG. 3.

FIG. 7 is a view in elevation and in section of the stake-pocket mounted between the crossbeams, taken along the line 7—7 of FIG. 3.

Figure 1:
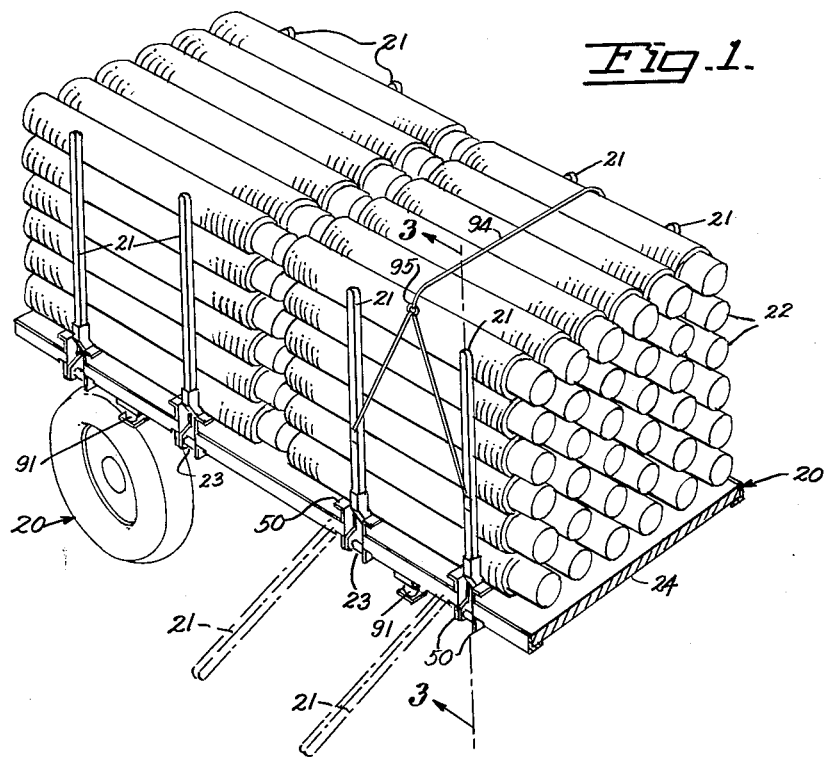

The present invention may be installed on any suitable freight-carrying vehicle such as a railroad flat car, truck, or the trailer 20 shown in FIG. 1. Broadly speaking, our invention comprises a system of removable bunk stakes 21 for confining high loads comprised of generally unstable cylindrical objects 22. The objects 22 illustrated are molds for concrete piles, usually made from corrugated iron. Being hollow, they are usually light in weight. The stakes 21 are adapted to be removably insertable in receptacles or stake-pockets 23, which are pivotally mounted on the sides of the vehicle cargo deck 24. Each pocket 23 is normally held securely in an upright position by a locking pawl 25 (FIGS. 3 and 4) which normally bears against a roller 45 attached to the pocket 23.

A novel means for releasing the stake 21 from its normally upright cargo-retaining position to the ramp-like unloading position is provided by a release linkage 26, shown in FIGS. 3 and 4. The linkages 26 are preferably joined in pairs to release two stakes 21 simultaneously and are uniquely arranged to provide smooth, easy actuation. Upon arrival at the unloading site, the operator merely actuates a release handle 27, located safely on the opposite side of the cargo deck 24 from the stakes 21 being released. The handle 27 operates the linkage 26, causing the pawl 25 to disengage itself from the roller 45 on the stake-pocket 23 so that the stakes 21 can swing downward. The novel release-linkage 26 includes a safety-latch member 28 which must be moved by the operator before the release handle 27 can be actuated, so that the load cannot be dumped inadvertently.

Turning now to the detailed structure of the illustrated embodiment and referring first to FIG. 3, the stakes 21 have an upper portion 29 preferably made from structural steel of any suitable cross-section, such as an I-beam or channel. It would, of course, also be possible to make this upper stake-portion 29 from some other material, such as wood having appropriate strength characteristics. The lower end 30 of the stake 21 may be integral with the upper portion 29 or joined to it in some convenient manner, such as by welding or bolting it thereto. In the form of the invention shown, the lower portion 30 and the upper portion 29 of the stake 21 are made from a single piece of structural steel I-beam of suitable length. The lower portion 30 is made square in cross-section by removal of the web section and by welding plates 31 to the sides of the I-section. (See FIG. 6.)

The stakes 21 are adapted to fit within the stake-pockets 23, which are mounted pivotally along the sides of the trailer-deck 52. A retaining-pin 32, which fits through a hole 33 in each stake-pocket 23 and a similar hole 34 through the lower stake-portion 30, is employed to retain the stakes 21 in the pockets 23 (FIGS. 3 and 6). On the retaining-pin 32 is mounted a movable safety-catch 35 which is pivotal to retain the pin 32 in place when the stake 21 is in position within the stake-pocket 23. A chain 36 is attached to the pin 32 to retain it on the vehicle when not in place in the stake-pocket 23.

Each stake 21, in its lower portion 30, is provided with an offset bend 37 just above that part of the stake that fits within the stake pocket 23. The offset bend 37 provides an adjustable feature whereby the stakes 21 may be removed from the stake-pocket 23 and reversed 180° as shown by the phantom lines in FIG. 3. When the stakes 21 are then reinserted in the stake-pocket 23 they effectively reduce the distance between stakes on opposite sides of the vehicle and thus a load having a different overall width can be snugly accommodated. This is particularly advanatgeous where the diameters of the cylindrical objects 22 may vary with different loads.

Each stake-pocket 23 has a main body portion 38 which may be cast or fabricated from plate stock to form a receptacle 39 having the same cross-sectional shape as the lower stake-portion 30 and adapted to telescopically receive it. Attached to or integral with the stake-pocket 23 are bearing support members 40 which extend outwardly from the lower portion of the stake-body 38 and have bearing holes 41 to receive a pin 42 about which the stake-pocket 23 will rotate when it is released for unloading. On the side opposite the bearing support members 40 on the stake-body portion 38 is fixed an extended bifurcated projection 43, through which is attached an axle 44 having a hardened steel roller 45 mounted thereon. Just above the projection 43 is a stop-member 46 extending outwardly from the pocket-body 38.

In a typical installation illustrated in the drawings, the pockets 23 are installed along both sides of a trailer-deck 24 and are supported by channel-members 50 (FIGS. 1, 2, and 5), forming cross-beam supports which are arranged in parallel pairs attached at intervals across the trailer frame-members 51. (See FIG. 7.) Wood planks 52 may be placed between pairs of channel-members 50 to provide the cargo deck 24. At both ends of each pair of channel-members 50 and on the lower flanges thereof are welded bearing-brackets 53, which retain the pins 42 on which are pivotally mounted the bearing-members 40 attached to stake-pockets 23. A stop-plate 54 (FIG. 5) is welded across the lower flanges 55 of the channel-members 50, to serve as a seat to support the projection 43 of the stake-pockets 23. Thus, while the stake-pocket 23 and its stake 21 are in the upright position they are supported on the trailer by the pin 42 and the stop-plate 54.

The rectangular locking-pawl 25 is pivotally mounted on a pin 56 or a bolt attached between the channel-members 50, and hangs substantially vertical with its end 57 that lies adjacent the roller 45. Consequently, the pawl-member 25, when hanging vertically, holds the foot-like projection 43 firmly against the stop-plate 54 to maintain the stake 21 in a substantially rigid, upright position. The end 57 of the locking-pawl 55 is case-hardened, as is roller 45, to decrease wear at this point so that the locking-pawl 25 will always hold the projection 43 tightly against the stop-plate 54 and prevent excess play in the stake-pocket 23 when it is in the upright position.

The release-linkage 26, shown in detail in FIG. 3, is attached to the locking-pawl 25 to facilitate the lowering of the stakes 21 for unloading. An arm 60, rigidly attached to the locking-pawl 25, is connected by a pin 61 to a rod-fitting 62 which is adjustably attached to a connecting-rod 63 extending to the opposite side of the cargo deck 24. The rod 63 is threaded so as to be adjustably attached to the fitting 62, being retained in position by a lock-nut 58. At its other end, the rod 63 is retained by a lock-nut 59 in the same manner, to a similar second rod-fitting 64, which is attached by a pin 65 to a bell-crank 66. A return-spring 67 is attached at one end to the rod 63 and at its other end to the channel-member 50 or some suitable fixed structure, causing the rod 63 to constantly urge the locking-pawl 25 against the stop 46 in the locking position.

The bell-crank 66 is pivotally attached by its upper-leg 68 to the channel-member 50 by a pin 69. A slot 70 is cut in the lower-leg 71 of the bell-crank 66 and provides a lost-motion connection between the bell-crank 66 and a link 73. This slip-joint action takes effect when the stakes 21 are returned separately to the upright position, after the unloading process. A pin 72 attached to one end of the link 73 is slightly smaller in diameter than the width of the slot 70 of the bell-crank 66, and is thus slidable therein. The link 73 is connected at its other end by a pin 74 to a crank-arm 75, which is attached to an operating shaft 76 supported by a pair of bracket-members 77 and 77a attached to the frame-member 51. The shaft 76 is rotated to actuate the linkage 26 by an operating lever-arm 78 which is attached thereto by any suitable means, such as welding.

To clearly illustrate the action of linkage 26, a single linkage 26 is shown in FIG. 4 with the locking pawl 25 just disengaging the roller 45, allowing the stake-pocket 23 with its stake 21 to be released and to commence its downward rotation.

In a preferred embodiment of the present invention, and as illustrated in FIG. 5, the shaft 76, supported by the brackets 77 and 77a at either end, is connected by the crank-arms 75 and 75a to an identical pair of linkages 26 and 26a which are similar in every respect and connected to similar but separate stake-pockets 23, not shown in this view. Thus, movement of the single release handle 27 actuates both linkages 26 and 26a to simultaneously release a pair of stakes 21.

On a fully equipped truck or trailer 20, any desired number of pairs of stakes 21 may be installed along the sides of the cargo deck 24, with each stake having a linkage 26 which may be conveniently controlled by a single release-handle 27 in the manner set forth above. The installation shown in FIG. 3 shows how the linkages 26 for the stakes 21 on opposite sides of the trailer 20 may be side-by-side between the cross-beam channels 50. Where desirable, as for example on smaller vehicles, single stakes can be used with only a single release-linkage. Branching cross-members may be attached to the stake to provide load-retaining coverage.

A safety means 81 (FIG. 5) for the release-linkage 26, to prevent accidental dumping of the load, is provided by two safety-latch members 28 mounted on a shaft 83, which is supported by brackets 84 attached to the channel-members 50. The latch members 28 are welded to and extend outwardly from the shaft 83 and when in locking position they engage a projection 85 on each bell-crank 66 of the interconnected linkages 26 and 26a, to prevent movement and accidental release of the stake-pockets 23. An arm 87 attached to the shaft 83 projects outwardly and is connected by a spring 88 to fixed structure, such as stop-plate 54 or the channel-member 50. The spring 88 constantly urges the latch-members 28 against the projections 85 of the bell-cranks 66 to maintain the linkages 26 and 26a in locked position. A second arm 89 on the shaft 83 provides an attachment for a safety-handle 90 (FIG. 3), by which the shaft 83 can be rotated to unlock the latch 28 and free the bell-crank 66 for the stake-pocket tripping action.

For use in combination with the releasable bunk-stakes 21 during the unloading procedure (see FIGS. 1 and 2), a snubbing post 91 (see FIG. 5), supported by brace 92, is attached on the inside of the truck-bed 24 approximately midway between the stake-pockets 23. On the edge of truck-bed 24 above the snubbing-post 91 is mounted a rounded edge-member 93 to enable the free travel of a snubbing-rope or load-line 94 over the edge, without fraying it. During the loading operation, the snubbing-ropes 94 are attached to each of a pair of stakes 21 at approximately their mid-points and carried through a halter 95 between each pair of stakes 21 and thence over the load, to be secured on the opposite side of the trailer on snubbing-post 91.

In operation, the steel shells or tubes 22 are loaded on the truck or trailer 20 with the stakes 21 in the upright position, as shown in FIG. 1. The stakes 21 are held rigidly in place within the pockets 23 in an upright position by the locking-pawl 25, to provide firm side-support for the load. With the offset feature of the stakes 21, they can be placed in the pocket-receptacles 23 in various positions, as shown by the dotted lines in FIG. 3, to accommodate shells or tubes 22 of different diameters. The load of shells is normally secured by the snubbing-lines 94, which pass over the top thereof and are secured to the snubbing-posts 91 on the side of the truck-bed 24.

Upon arrival of the loaded truck or trailer 20 at its destination, the load-lines 94 are released by the operator on the side of the trailer 20 opposite to the unloading side and are slidably secured around the snubbing-post 91. The safety-handle 90 is then moved downward to rotate the shaft 93, moving the safety-latches 28 up and and away from the bell-crank projections 85. The operating release-handle or control-lever 27 is then moved downward, which turns the shaft 76 and the crank-arms 75, thereby moving the pin 74 of the link 73 along the slot 70 until the bell-crank 66 rotates about the pin 69. Upon rotation of bell-crank 66, the connecting-rod 63 moves the locking-pawl 25, causing it to rotate around the pin 56 and off the roller 45, which is mounted on the projection 43 of the stake-pocket 23. When the locking-plate 25 is completely free from the roller 45 and the projection 43, the pockets 23 are free to rotate about the pins 42, and the weight of the load causes the stakes 21 and the pockets 23 to rotate downward. Soon the stakes 21 engage the ground surface and serve then as ramps, as shown in FIGS. 1 and 2.

Figure 2:
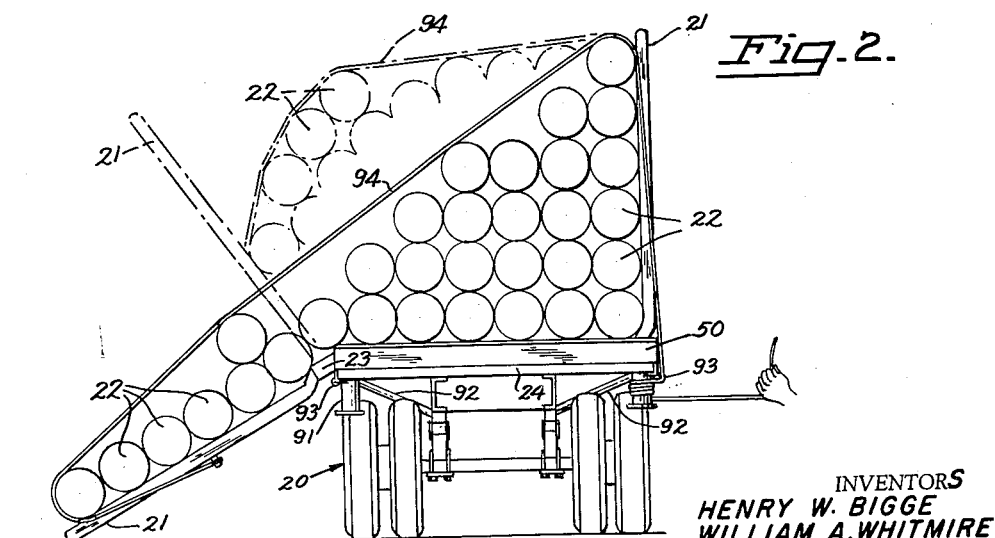

The operator may then control the descent of the cylindrical shells 22 as shown in FIG. 2, as well as the lowering of the stakes 21, by use of the snubbing-rope 94 around the snubbing-post 91 in a standard manner. Thus it is seen that the loading process has been immeasurably simplified. Instead of requiring removal of the shells or tubes 22 one at a time or by use of expensive auxiliary equipment, they may be lowered rapidly to ground level directly from the vehicle at any predetermined unloading site.

In the case of many loads, such as logs, no snubbing will be required and simple release procedure will suffice to dump the load safely.

After the unloading process has been completed, the stakes 21 may be returned manually to the upright position one at a time by merely rotating them in a reverse direction. Note that the return-spring 67 on the rod 63 will cause the locking-pawl 25 to return to its vertical position following release of the stakes 21 and release of the operating-handle 27. Therefore, when the pocket 23 is rotated back toward its upright position, the roller 45 engages and again pushes the locking-pawl 25 back against the force of the spring 67, until the projection 43 comes to rest against the stop-plate 54. At this moment the return-spring 67 returns the locking-pawl 25 to its original upright locking position over the projection 43 and the roller 45. An important feature of the present invention is that, while each stake is being returned to its upright position, the roller 45 engages the locking-pawl 25 with a typical roller-cam action, which provides easy movement of the stake-pocket 23.

Even though the stakes 21 are employed in pairs controlled by a single release-lever 80, each stake 21 may be returned separately to its upright position. With the locking-pawl 25 held in the vertical position by the return-spring 67 and the release-handle 27 similarly returned to its normal horizontal position, the pressure of the roller 45 against the locking-pawl 25 will cause movement of the rod 63 and the bell-crank 66. However, such movement merely results in lost motion of the pin 72 of the link 73; the pin 72 slides along the slot 70 instead of causing movement of the link 73, the crank 75, and the release-handle 27. After the roller 45 passes below the end 57 of the locking-pawl 25, the pawl 25 is snapped again into its locking position by the return-spring 67, thereby returning the bell-crank 66 to its locked position.

Upon the return of the pawl 25 to its normal locking position on top of the projection 43 and the movement of the connecting-rod 63 returning the bell-crank 66 to its original position, the safety-latch 82, urged by its springs 88, returns to rest on the projection 85 against the bell-crank 66. The vehicle can now be reloaded without any danger of accidental unloading.

As will be apparent from the operation just described, the present invention comprises a cargo-retaining and unloading system of unique capabilities. Our novel device not only provides for the snug loading of high stacks of cylindrical objects but also provides a release and unloading linkage which is locked safely during transit of the vehicle. Upon arrival at the unloading site, the stakes are lowered easily when the release linkage is actuated by an operator located on the side of the vehicle opposite from the unloading side. The system also provides for the controlled lowering of the cylindrical objects, by the operator, wherein the lowered stakes form an unloading ramp. The unique arrangement of linkage elements while providing for the lowering of the stakes in pairs also allows each stake to be raised and latched to its upright position individually. Thus, the novel cooperation of elements of the present invention provides a cargo-retaining and unloading system having highly useful features not found in the prior art.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting

We claim:

1. In a vehicle having a fixed frame, a cargo deck, and normally upright load-retaining stakes, the combination therewith of: stake pockets pivotally mounted along the sides of said cargo deck and having receptacles to telescopically receive said stakes; a projection mounted on each said stake pocket; locking pawl means adapted to hold each said projection and retain said stake pocket in an upright position; a connecting rod attached to said locking pawl and extending to the opposite side of said vehicle frame; an actuation linkage means attached to said connecting rod; a release handle attached to said linkage means; stop means on said linkage means; and spring-loaded safety means controllable by a second handle and normally urged against said stop means to prevent inadvertent release of said stake pockets, whereby movement of said release handle moves said connecting rod to release said locking pawl, causing said stakes and stake pockets to pivot downward to serve as ramp means for discharging the vehicle cargo.

2. In a vehicle having a fixed frame, a cargo deck, and normally upright load-retaining stakes, the combination therewith of: stake pockets pivotally mounted along the sides of said cargo deck and having receptacles to telescopically receive said stakes; a projection mounted on each said stake pocket; a roller mounted on each said stake pocket projection and adapted to engage said locking pawl when each said stake pocket is being returned to the upright position; locking pawl means adapted to hold each said projection and retain said stake pocket in an upright position; a connecting rod attached to said locking pawl and extending to the opposite side of said vehicle frame; an actuation linkage means attached to said connecting rod; and a release handle attached to said linkage means, whereby movement of said release handle moves said connecting rod to release said locking pawl, causing said stakes and stake pockets to pivot downward to serve as ramp means for discharging the vehicle cargo.

3. In a vehicle having a fixed frame, a cargo deck, and normally upright load-retaining stakes, the combination therewith of: stake pockets pivotally mounted along the sides of said cargo deck and having receptacles to telescopically receive said stakes; a projection mounted on each said stake pocket; locking pawl means adapted to hold each said projection and retain said stake pocket in an upright position; a connecting rod attached to said locking pawl and extending to the opposite side of said vehicle frame; an actuation linkage means attached to said connecting rod; a release handle attached to said linkage means for moving said connecting rod to release said locking pawl, causing said stakes and stake pockets to pivot downward to serve as ramp means for discharging the vehicle cargo; and return spring means adapted to cause said locking pawl to snap into latching position when said stake pocket is returned to the upright position.

4. In a vehicle for carrying a plurality of stacked unstable objects, said vehicle having a substantially flat cargo deck, the combination therewith of: at least one pair of load-retaining stakes pivotally mounted along each side of said cargo deck and adapted to retain said objects on said vehicle; separate locking pawl means to maintain each stake in an upright position; linkage means adapted to control each of said locking pawl means and extending to the opposite side of said vehicle; release means controlling each pair of linkage means actuatable by a single control handle to move said locking pawl means to cause lowering of a pair of stakes to provide a ramp for the discharge of the stacked objects; and safety means operatively associated with said release means to limit movement thereof and thereby prevent inadvertent tripping of said cargo.

5. In a vehicle for carrying a plurality of stacked unstable objects, said vehicle having a substantially flat cargo deck, the combination therewith of: at least one pair of load-retaining stakes pivotally mounted along each side of said cargo deck and adapted to retain said objects on said vehicle; separate locking pawl means to maintain each stake in an upright position; linkage means adapted to control each of said locking pawl means and extending to the opposite side of said vehicle, and release means controlling each pair of linkage means actuatable by a single control handle to move said pawl means to cause lowering of a pair of stakes to provide a ramp for discharge of the stacked objects, said linkage means including slip joint means for allowing return of each stake to its upright position separately after the stacked objects have been dumped.

6. In combination with a vehicle without sides for carrying a load of stacked articles, a releasable cargo-retaining system comprising: at least one stake; said stake being telescopically mounted in a stake pocket; said stake pocket being pivotally mounted on said vehicle; a projection on said pocket, and a roller mounted thereon; a pivotal locking pawl attached to said vehicle and adapted to normally hold said projection against a stop-plate to maintain said stake pocket in an upright position; linkage means connected to said locking pawl and controlled by an operating handle located on the side of the vehicle opposite to the locking pawl; whereby movement of the operating handle actuates said linkage to move said locking pawl away from said projection to release said stake pocket.

7. The device as described in claim 6 wherein said stake has an offset bend in its lower portion and is alternately positionable within said stake pocket to accommodate loads comprising objects of different diameters.

8. The device as described in claim 7 wherein said cargo-retaining system comprises stakes removably attached to stake pockets and arranged in pairs along the sides of the vehicle, each pair of stake pockets being releasable by a single control handle.

9. In combination with a vehicle without sides for carrying a load of stacked articles, a releasable cargo-retaining system comprising: a pair of stakes, each of said stakes being telescopically mounted in a stake pocket, each of said stake pockets being pivotally mounted on said vehicle and having a roller attached thereto; pivotal locking pawls attached to said vehicle and adapted to normally hold said roller on each of said stake pockets against a stop plate to maintain said stake pockets in an upright position; an operating handle; linkage means connected to each of said locking pawls and controlled by said operating handle located on the side of the vehicle opposite the locking pawls; spring means on each linkage means normally urging each locking pawl into locking position; each said linkage means including a slotted crank member; each slotted crank member being pivotally connected at one end to means attached to the locking pawl of its respective linkage means and being slidably connected at its other end to means connecting said operating handle; whereby movement of said operating handle in one direction will cause positive movement of said crank member to actuate each said linkage means to release said pair of stake pockets, and upon return of each stake pocket to its upright position said roller on each stake pocket engages its respective locking pawl, causing said locking pawl to retract and the slotted crank means to rotate without causing movement of the operating handle, thus permitting each stake to be repositioned, one at a time.

10. In a vehicle for carrying a plurality of stacked unstable objects, said vehicle having a substantially flat cargo deck, the combination therewith of: at least one pair of load-retaining stakes pivotally mounted along each side of said cargo deck and adapted to retain said objects on said vehicle; locking pawl means adapted to hold each stake in an upright position; linkage means connected with each of said locking pawl means; spring means normally urging each locking pawl in a locking position; means connecting each pair of said linkage means to a single operating handle; a lost-motion connection in each of said linkage means, adapted to provide simultaneous positive movement of both linkages in one direction and limited independent movement of adjoining linkages in the opposite direction, whereby actuation of the operating handle in one direction will move both of said pair of locking pawls to release said stakes and lower them from said cargo deck and each stake is returnable separately to its upright position without causing movement of the operating handle.

11. In a vehicle for carrying a plurality of stacked unstable objects, said vehicle having a substantially flat cargo-deck, the combination therewith of: at least one pair of load-retaining stakes pivotally mounted along each side of said cargo-deck and adapted to retain said objects on said vehicle; a fixed projection means associated with each of said stakes; separate pivotal locking pawl means normally positioned to engage said projection means to maintain each stake in an upright position and constantly urged into locking position by a spring means; linkage means adapted to control each of said locking-pawl means and extending to the opposite side of said vehicle; release means controlling each pair of linkage means actuatable by a single control handle to move said pawl means from its locking position to cause lowering of a pair of stakes to provide a ramp for discharge of the stacked objects; and lost-motion means on said linkage means to allow the retraction of a said locking pawl as each stake is returned to its upright position, said projection means being adapted to bear against a surface of said locking-pawl means as it passes over said locking-pawl means and into locking engagement therewith.

12. The device described in claim 11 wherein said projection means includes roller means adapted to engage the generally planar surface on said locking pawl as the stake is being returned to its upright position.

References Cited in the file of this patent

UNITED STATES PATENTS

| | | |
|---|---|---|
| 866,344 | Dyer | Sept. 17, 1907 |
| 1,422,717 | Joosting | July 11, 1922 |
| 2,131,337 | Swertfeger | Sept. 27, 1938 |